United States Patent [19]

Nakagawa et al.

[11] Patent Number: 4,792,893
[45] Date of Patent: Dec. 20, 1988

[54] SELECTIVELY RECURSIVE PIPELINED PARALLEL VECTOR LOGICAL OPERATION SYSTEM

[75] Inventors: Takayuki Nakagawa, Kokubunji; Koichiro Omoda, Sagamihara, both of Japan

[73] Assignee: Hitachi, Ltd., Tokyo, Japan

[21] Appl. No.: 782,534

[22] Filed: Oct. 1, 1985

[30] Foreign Application Priority Data

Oct. 3, 1984 [JP]  Japan ................ 59-206216

[51] Int. Cl.[4] ............................ G06F 7/48
[52] U.S. Cl. ............................ 364/200
[58] Field of Search ... 364/200 MS File, 900 MS File, 364/730, 736

[56] References Cited

U.S. PATENT DOCUMENTS

| | | | |
|---|---|---|---|
| 3,573,851 | 4/1971 | Watson et al. | 364/200 |
| 4,270,181 | 5/1981 | Tanakura et al. | 364/736 |
| 4,435,765 | 3/1984 | Uchida et al. | 364/200 |
| 4,458,330 | 7/1984 | Imsand et al. | 364/900 |
| 4,525,796 | 6/1985 | Omoda et al. | 364/730 |
| 4,533,993 | 8/1985 | McCanny et al. | 364/200 |
| 4,617,625 | 10/1986 | Nagashima et al. | 364/200 |
| 4,641,275 | 2/1987 | Hatakeyama et al. | 364/730 |
| 4,723,206 | 2/1988 | Kojima et al. | 364/200 |
| 4,725,973 | 2/1988 | Matsuura et al. | 364/900 |

Primary Examiner—Raulfe B. Zache
Assistant Examiner—Eric Coleman
Attorney, Agent, or Firm—Antonelli, Terry & Wands

[57] ABSTRACT

A vector logical operation apparatus includes first and second registers respectively for sequentially receiving first and second sets of vector elements which first and second sets of vector elements are supplied in pairs on the same sequential clock periods; third register; a plurality of first gates connected to the first and third registers each for performing a first bitwise logical operation on bit signals partly provided from the first register and the third register; a plurality of second gates connected to the second register and the first gates in a bitwise manner each for performing a second bitwise logical operation on bit signals provided from the second register and the first gates; a feed back circuit connected to the plurality of second gates for supplying the outputs of the second gates to the third register; and control circuit connected to the third register for ordering the third register to receive an applied initial data signal on or before supply of a pair of the first vector element of the first set and second set and to repeatedly receive the outputs of the second gates provided by the feed back circuit on sequential clock periods each clock period being one clock period later after receipt a pair of vector elements by the first and second registers; wherein the first and second gates are operable fast enough so that the outputs of the second gates at the end of each clock period fully responds to vector elements held by the first to third registers at the beginning of each clock period.

8 Claims, 7 Drawing Sheets

FIG. 1

```
Dō    J = 1  Tō  N ;
   A(J) = ( A(J-1) & B(J) ) | C(J) ;
END ;
```

| B(1-7) | C(1-7) | A(1-7) |
|---|---|---|
| 11····1 | C1 | A(0)¦C1 |
| 00····0 | C2 | C2 |
| 11····1 | C3 | C2¦C3 |
| 11····1 | C4 | C2¦C3¦C4 |
| 00····0 | C5 | C5 |
| 00····0 | C6 | C6 |
| 11····1 | C7 | C6¦C7 |

SELECTIVELY RECURSIVE PIPELINED PARALLEL VECTOR LOGICAL OPERATION SYSTEM

BACKGROUND OF THE INVENTION

The present invention relates to a vector logical operation apparatus for vector data and a vector processor using such a vector logical operation apparatus.

In a prior art vector processor, there is provided an instruction to speed up processing of A(J)=A(J−1)*B(J)+C(J) in a FORTRAN sentence as means for reflecting a result of operation performed by using a J-th element data of the vector data to an operation performed by using (J+1)th and following element data, where * and + represent arithmetic product and arithmetic sum and A(J) represents the J-th element in an array data A. One example is disclosed in U.S. Pat. No. 4,525,796 issued on June 25, 1985. In image processing and logical simulation, the arithmetic product and the arithmetic sum in the above formula are substituted by logical product and logical sum, but they cannot be vector-processed.

SUMMARY OF THE INVENTION

It is an object of the present invention to provide a logical operation apparatus which can carry out a logical operation expressed in PL1 language by A(J)=(A(J−1) & B(J))|C(J) or A(J)=(A(J−1)|B(J)) & C(J) at one machine cycle pitch per element of A(J), where A(J), B(J) and C(J) are data comprising one or more bits, and & and | represent logical product (logical AND) and logical sum (logical OR), respectively.

In order to achieve the above object, there is provided a vector logical operation apparatus, having first and second registers respective for sequentially receiving first and second sets of vector elements which first and second sets of vector elements are supplied in pairs on the same sequential clock periods; a plurality of third registers; a plurality of first gates connected to the first and third registers each for performing a first logical operation on bit signals partly provided from the fist registers and partly provided from the third registers; a plurality of second gates connected to the second registers and the plurality of first gates each for performing a second logical operation on bit signals provided from the second registers and provided from the plurality of gates; a feedback circuit connected to the plurality of second gates for supplying the outputs of the plurality of second gates to the third registers; and a control circuit connected to the third registers for ordering the third registers to receive an applied initial data signal on or before supply of a pair consisting of the first vector element of the first set and the first vector element of the second set and to repeatedly receive the outputs of the plurality of second gates provided by the feedback circuit on sequential clock periods each clock period being one clock period later after receipt of a pair of vector elements by the first and second registers; wherein the plurality of first and second gates are operable fast enough so that the outputs of the plurality of second gates at the end of each clock period fully responds to vector elements held by the first to third registers at the beginning of each clock period.

DESCRIPTION OF THE PREFERRED EMBODIMENTS

Figure 1:
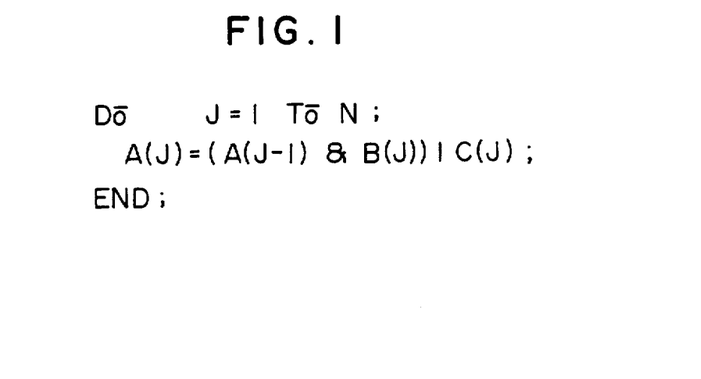
FIG. 1 shows a DO loop in a PL1 program.

FIG. 1 shows an example of DO loop described by the PL1 language. Each element of each of vector data A(0−N), B(1−N) and C(1−N)is 1 to 64-bit string. In processing the program, the vector elements A(0) and B(1) are logically ANDed, the result thereof and C(1) are logically ORed, and the result thereof is stored as an intermediate result A(1). The same processing is repeated N times while the element number of the vector data is sequentially incremented by one.

Figure 2:
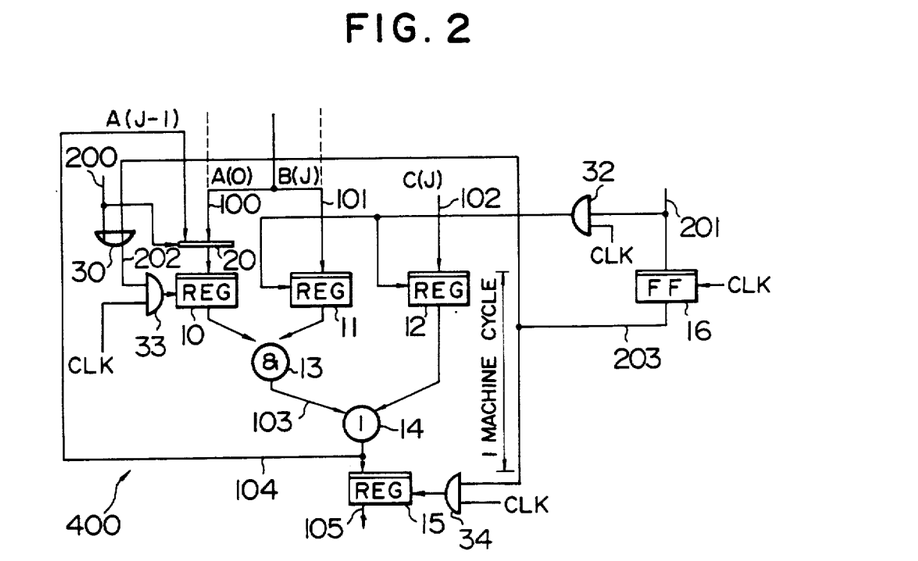
FIG. 2 shows one embodiment of a logical operation apparatus of the present invention.

FIG. 2 shows a configuration of a pipeline logical operation apparatus 400 which carries out the logical operation of the program shown in FIG. 1 at a high speed. Numerals 10, 11, 12 and 15 denote 64-bit width registers which are used to hold the vector elements A(J−1), B(J), C(J) and A(J), respectively. Numerals 13 and 14 denote 64 AND gates and 64 OR gates which carry out logical AND and logical OR operations bit by bit. Numeral 30 denotes an OR gate and numerals 32, 33 and 34 denote AND gates. Numeral 104 denotes a feedback path through which outputs of the OR gates 14 are supplied to a selector 20. Numeral 200 denotes a set signal which instructs setting of the data A(0) into the register 10, and numeral 201 denotes a data valid signal which indicates arrival of the pair of vector elements B(J) and C(J). The selector 20 selects a data on a line 100 in response to the set signal 200 and selects a data on a line 104 when the set signal 200 is not applied. Numeral 16 denotes a flip-flop which sets the data valid signal 201 in response to a machine clock CLK and is used as means to delay the data valid signal 201 by one machine cycle.

In one machine cycle, the data A(0) is supplied from the signal line 100 in synchronism with an input of the control signal 200, and the selector 20 selects the data A(0) in response to the control signal 200 and supplies it to the register 10. The control signal 200 is used as a set signal to the reister 10 through the OR gate 30 and the signal line 202. Thereafter, two vector elements B(1) and C(1) are supplied synchronously to each other through the lines 101 and 102. The signal 201 is supplied in synchronism with the application of the data B(1) and C(1) to the logical operation apparatus. The signal 201 is applied to the AND gate 32 together with the machine clock CLK, and the registers 11 and 12 set the vector elements B(1) and C(1) in response to the output of the AND gate 32. The contents A(0) and B(1) of the registers 10 and 11 are ANDed bit by bit by the AND gates 13, and the outputs 103 of the AND gate 13 are supplied to the OR gates 14 which OR the AND outputs 103 and the content C(1) of the register 12 bit by bit. The outputs 104 of the OR gate 14 are A(0) & (1)|C(1), which represents the data A(1).

The signal 203 is applied to the AND gates 33 and 34 together with the clock CLK, and the outputs of the AND gates 33 and 34 are used as set signals to the registers 10 and 15, respectively. The operation result 104 is set in the register 15 in response to the signal 203. The AND gates 13 and the OR gates 14 comprise high speed gates such that when the data B(1) and C(1) to the registers 11 and 12 are set, the operation result A(1) is produced on the line 104 in one machine cycle. Since the signal 203 is derived by delaying the signal 201 by one machine cycle by the flip-flop 16, the register 15 sets the operation results A(1) in the next machine cycle to the machine cycle in which the data B(1) and C(1) are set in the registers 11 and 12. The operation result A(1) is supplied to the register 10 through the line 104 and the selector 20, and the register 10 sets the data A(1) in response to the delayed set signal 203. In this manner, the data A(1) is set in the register 10 in the next machine cycle to the machine cycle in which the data B(1) and C(1) are set in the registers 11 and 12. Accordingly, when the data B(2) and C(2) and the set signal 201 are applied in this machine cycle, an operation result A(1) & B(2)|C(2) is obtained in that machine cycle in a similar manner.

Thus, when the vector elements B(J) and C(J) (J=1~N) are applied at one machine cycle pitch, the operation result A(J)=A(J−1) & B(J)|C(J) is obtained at one machine cycle pitch. The present logical operation apparatus effectively works even if B(J) and C(J) are not successively supplied.

Figure 3:
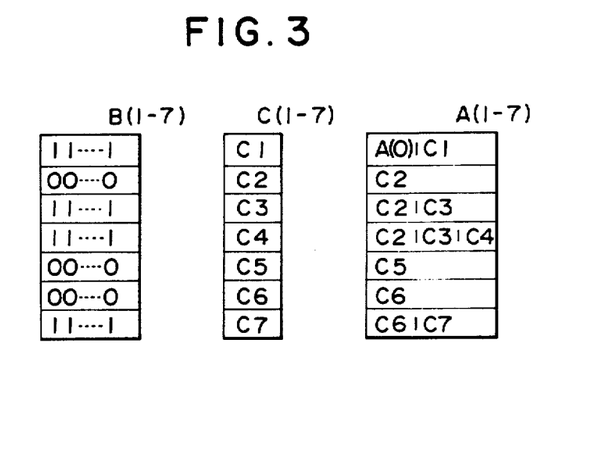
FIG. 3 shows an operation result by the apparatus of FIG. 2.

FIG. 3 shows examples of vectors B(1−7) and C(1−7) and the operation result in the logical operation apparatus of FIG. 2. In this example, B(J) comprises all 1's or all 0's.

In the present embodiment, the data A(0) and the set signal 200 therefor are sent one or more machine cycle earlier than the machine cycle in which the vector elements B(1) and C(1) are sent. As a result, as shown in FIG. 2, the signal line 100 may be shared by the signal line 101 (or 102).

Figure 4:
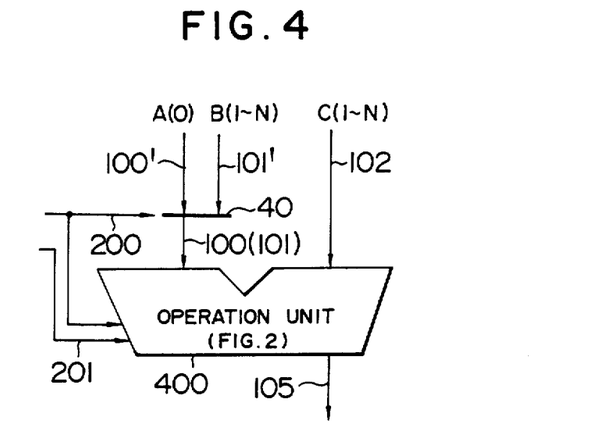
FIG. 4 illustrates a data input path to the apparatus of FIG. 2.

The data A(0) and B(1−N) may be supplied in a manner shown in FIG. 4. A selector 40 which selects the input lines 100' and 101' for the data A (0) and the vector data B(1−N) is provided. The signal line 100' for the data A(0) is first selected by the set signal 200, and then the input line 101' for the vector element B(1−N) is selected. The output of the selector 40 may be applied to the input lines 100 and 101 of the logical operation apparatus 400. Thus, the construction of the logical operation unit 400 is simplified.

If the supply of the set signal 200 has to be in the same machine cycle as the supply of the vector elements B(1) and C(1), the lines 100 and 101 must be separate lines as shown by broken lines in FIG. 2.

If it is previously assured that the data B(1−N) and C(1−N) are supplied in successive machine cycles, only the AND gates 32, 33 and 34 may be omitted and the machine clock CLK may be used as the signals 201, 202 and 203.

Figure 5:
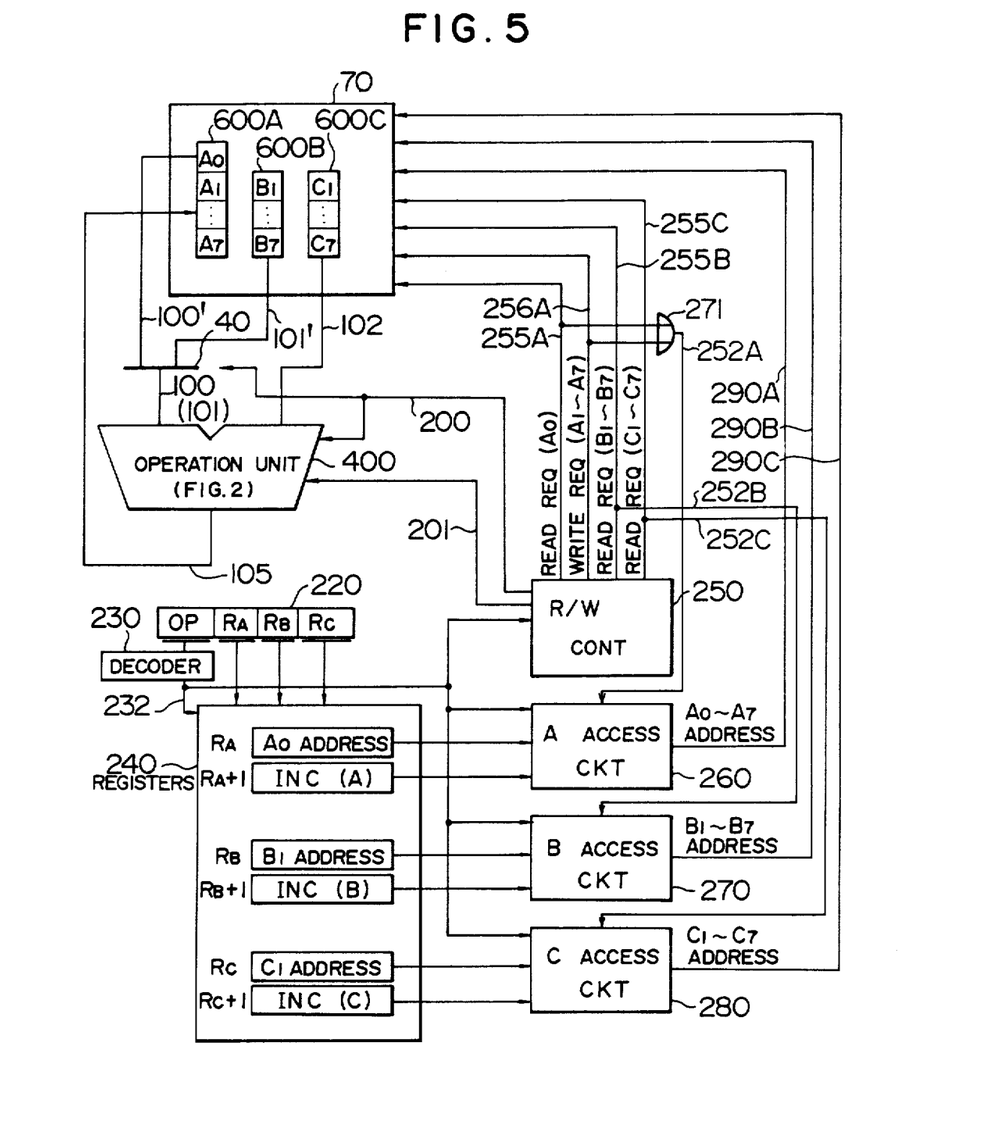
FIG. 5 shows on embodiment of a vector processor which uses the apparatus of FIG. 2.

FIG. 5 shows an embodiment of a vector processor without special registers which uses the logical operation apparatus of FIG. 2. Numeral 70 denotes a main memory, numeral 220 denotes an instruction register, numeral 230 denotes a decoder for decoding an instruction in the instruction register, numeral 240 denote general purpose registers, numerals 260, 270 and 280 denote A access circuit, B access circuit and C access circuit which generate addresses to access vectors, numeral 250 denotes an R/W control circuit for controlling the main memory 70, and other numerals denote the like elements to those shown in FIGS. 2 and 4. Other logical operation apparatus provided in the present vector processor are not shown for the purpose of simplification.

When the decoder 230 decodes an operation code OP of the instruction set in the instruction register 220 and determines that the instruction is to use the logical operation apparatus 400, it sends a signal 232 to the general purpose registers 240, R/W control circuit 250, A access circuit 260, B access circuit 270 and C access circuit 280. The general purpose registers 60 receive the signal 232 and three register numbers $R_A$, $R_B$ and $R_C$ in the instruction so that the registers having register numbers $R_A$, $R_{A+1}$, $R_B$, $R_{B+1}$, $R_C$ and $R_{C+1}$ are read out. Numerals 600A, 600B and 600C denote areas for the vectors A, B and C, respectively, which include vector element memory locations spaced by a predetermined address distance (increment). The data $A_0$ is stored at a start position of the area 600A, and the vectors B and C are stored in the areas 600B and 600C, respectively. The D-th element ($A_0$) address of the vector A, the first element ($B_1$) address of the vector B and the first element ($C_1$) address of the vector C are stored in the registers $R_A$, $R_B$ and $R_C$, respectively, and the address distances (increments) to the adjacent vector elements to the vectors A, B and C are stored in the registers $R_{A+1}$, $R_{B+1}$ and $R_{C+1}$, respectively.

The A access circuit 260, B access circuit 270 and C access circuit 280 reads in the data of the registers $R_A$ and $R_{A+1}$, the data of the registers $R_B$ and $R_{B+1}$, and the data of the registers $R_C$ and $R_{C+1}$, respectively, in response to the signal 232. The address generation by those circuits is controlled by the signals 252A, 252B or 252C from the R/W control 250. The A access circuit 260 sequentially sends the addresses of the vector elements $A_0$–$A_7$ to the main memory 70 through the line 290A. The B access circuit 270 and the C access circuit 280 send the addresses of the vector elements B1-B7 and the addresses of the vector elements C1-C7 to the main memory through the lines 290B and 290C, respectively.

Figure 6:
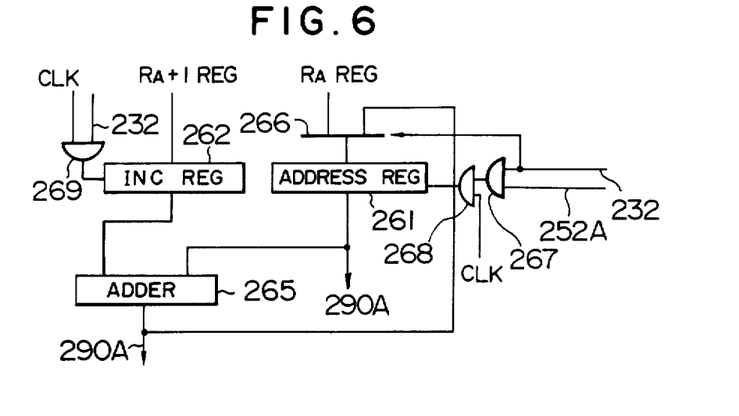
FIG. 6 shows an A access circuit of FIG. 5.

FIG. 6 shows the A access circuit, which sets the data of the registers $R_A$ and $R_{A+1}$ into an address register 261 and an increment register 262, respectively, in response to the decode signal 232, using AND gates 268 and 269 which are connected to the clock signal CLK. An adder 265 adds the output of the register 262 to the content of the address register 261. A selector 266 selects the output of the register $R_A$ when the signal 232 is applied, and selects the output of the adder 265 in other case and supplies it to the address register 261. An address register 261 sets the input thereto by an output of an OR gate 267 to which the decode signal 232 and the signal 252A from the R/W control 250 are applied. As a result, the signal 290A which is the output of the register 261 is the addresses A0, A1, A2, ... A7. The B access ciruuit 270 and the C access circuit 280 have similar circuit configurations.

Figure 7:
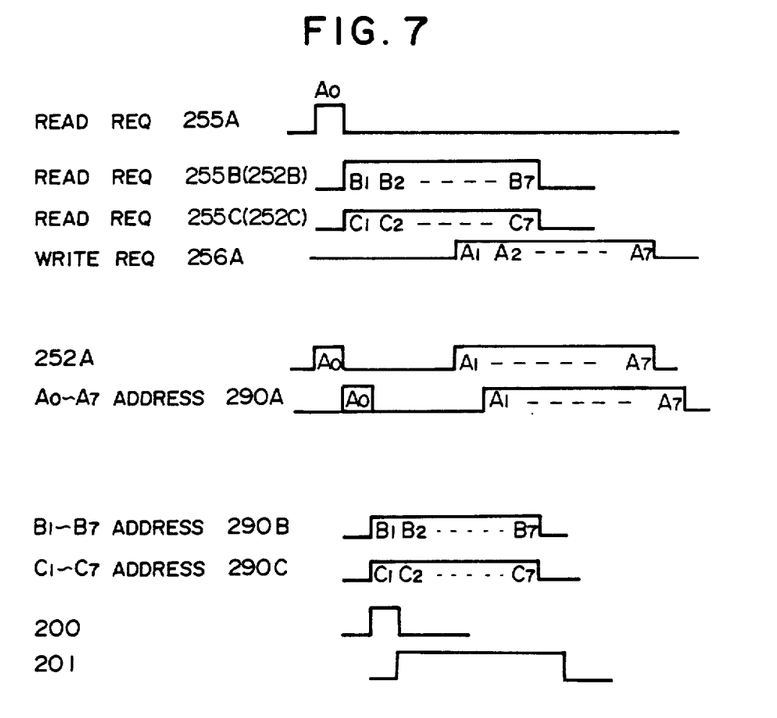
FIG. 7 shows a time chart of an output signal from an R/W control.

The R/W control circuit 250 outputs various signals at the timing shown in FIG. 7 in response to the decode signal 232. The R/W control 250 causes the A access circuit 260 to generate the address for $A_0$ in response to the signal 232 and outputs a read request to the vector element $A_0$ on the line 255A, using the OR gate 271 which is connected to the lines 255A, and 256A. In this manner the data $A_0$ is read out. In synchronism with the readout, the set signal 200 is sent to the selector 40 and the logical operation unit 400. Similarly, the signal 232 is outputted and the signals 252B and 252C are repeatedly outputted so that the B access circuit 270 and the C access circuit 280 generate the addresses $B_1, B_2, \ldots B_7$ and the addresses $C_1, C_2, \ldots C_7$, respectively. In synchronism with the generation of the addresses, the R/W control 250 sends the read request to $B_1-B_7$ and the read request to $C_1-C_7$ to the lines 255B and 255C, respectively. Thus, the vector elements $B_1-B_7$ and $C_1-C_7$ are sequentially read out. In synchronism with the readout, the set signal 201 is sent to the logical operation unit 400. The R/W control 250 repeatedly sends the signal 252A to the A access circuit 260 and repeatedly outputs the write request on the line 256A in synchronism with the output of the operation results $A_1-A_7$ on the line 105. In this manner, $A_1-A_7$ are written into the area of the main memory 70 following to the area of the data $A_1$.

In the circuit of FIG. 5, the read address for the data $A_0$ and the write addresses for the data $A_1-A_7$ are generated by the A access circuit 260 in response to the output of the OR gate 271 and based on the $A_0$ address and the increment.

Figure 8:
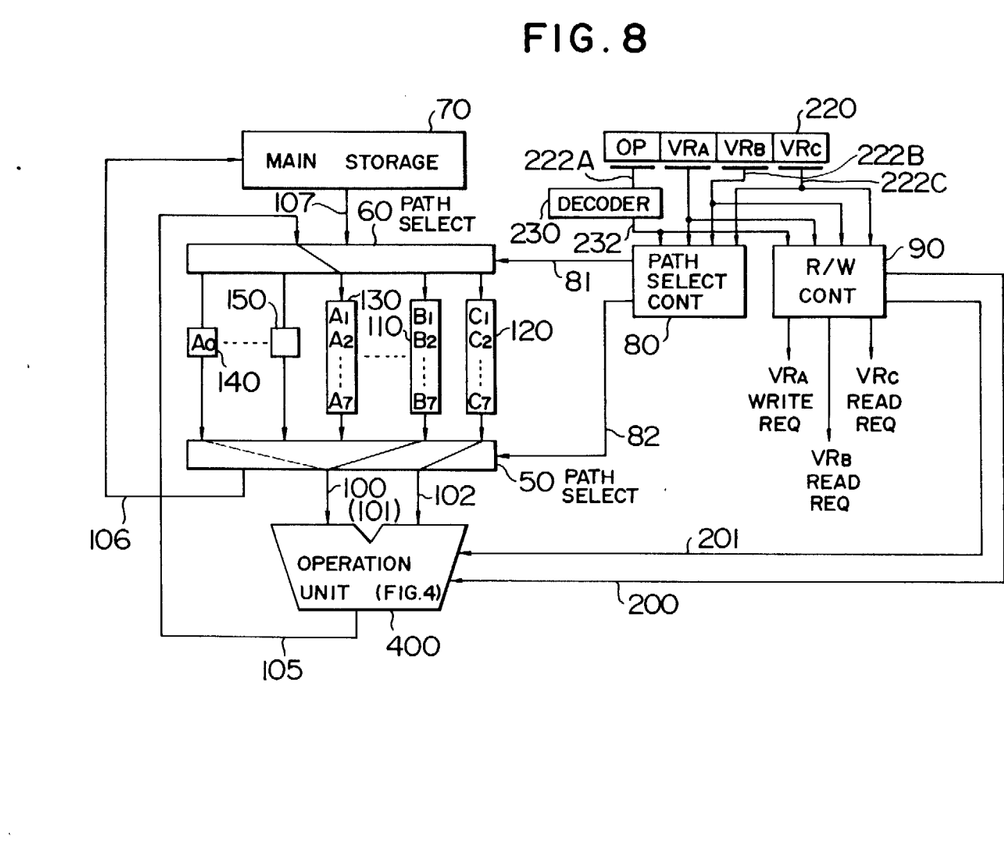
FIG. 8 shows a second embodiment of the vector processor which uses the apparatus of FIG. 2.

FIG. 8, shows another embodiment of the vector processor with scolar registers and Victor registers which uses the logical operation apparatus of the present invention. It comprises a main memory 70, a plurality of vector registers 110, 120, 130, . . . , and the same number of scalar registers 140, 150, . . . . The vector registers 110, 120, . . . and the scalor registers 140, 150, . . . are connected to inputs 100 and 102 of the logical operation apparatus 400 and an input 106 of the main memory 70 through a path select control 50, and connected to an output 105 of the logical operation apparatus 400 and an output 107 of the main memory 70 through a path select control 60. A path select control 80 controls the path select circuits 50 and 60, and an R/W control circuit 90 outputs signals for controlling reading and writing of the vector registers 110, 120, . . . and the scalar registers 140, 150, . . . add the logical operation apparatus 400 at the timing shown in FIG. 10. The other numerals which are identical to those shown in FIGS. 2 and 5 denote the like elements.

The vector processor which uses the vector registers has been known by U.S. Pat. No. 4,128,880, Japanese Unexamined Patent Publication No. 57-25068 and corresponding U.S. Patent Application Serial No. 453,094, which are incorporated herein by reference. When the decoder 230 decodes that the instruction set in the instruction register 220 is to use the logical operation apparatus 400, the output of the decoder 230 is sent to the path select control 80 and the R/W control 90 through the line 232. The path select control 80 sends to the path select 50 a signal 82 which instruct to connect the scalar register (for example, the scalar register 140 which stores the data $A_0$) having the register 140 which number corresponding to the vector register number $VR_A$, to the one input 100 of the logical operation apparatus 400, and connect the vector register 120 having the register number $VR_B$ (which stores the vector C) to the other input 102 of the logical operation apparatus, and sends to the path select 60 a signal 81 which instructs to connect the output 105 of the logical operation apparatus 400 to the input of the vector register 130 having the register number $VR_A$.

Figure 9:
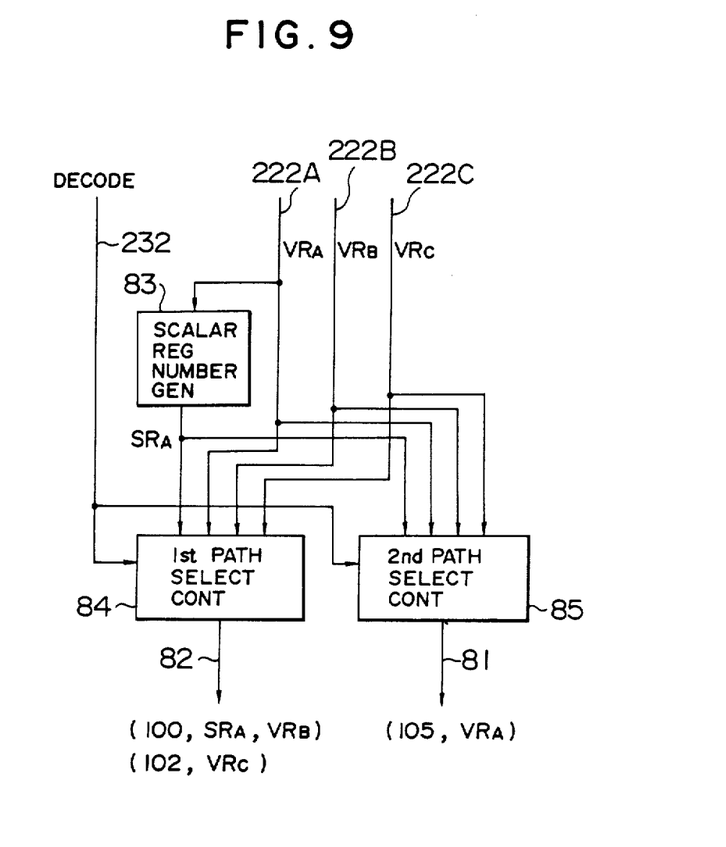
FIG. 9 is a block diagram of a path select control of FIG. 8.

FIG. 9 shows a configuration of the path select control 80, a scalar register number generator 83 outputs a scalar register number $SR_A$ which corresponds to (e.g. identical to) a register number $VR_A$ given from the line 222A. If the register number is represented by one bit which is 1 or 0 depending on whether it is a vector register or a scalar register and a register number which is independent from the type of register, the value of the one-bit data is changed by the scalar register number generator 83. A first path select controller 84 outputs the signal 82 to the path select control 50 in response to the instruction decode signal 232. It selects the register numbers of the registers to be connected to the input lines of the logical operation apparatus (400 in the present embodiment) necessary for the operation designated by the instruction decode signal 232, from the register numbers $SR_A$, $VR_A$, $VR_B$ and $VR_C$. Similarly, a second path control 85 outputs an instruction 81 to the select control 60. The first and second path select control circuits may be attained by modifying the above-mentioned Japanese Unexamined Patent Application or the corresponding U.S. patent application Ser. No. 453,094, filed 12/27/82.

Figure 10:
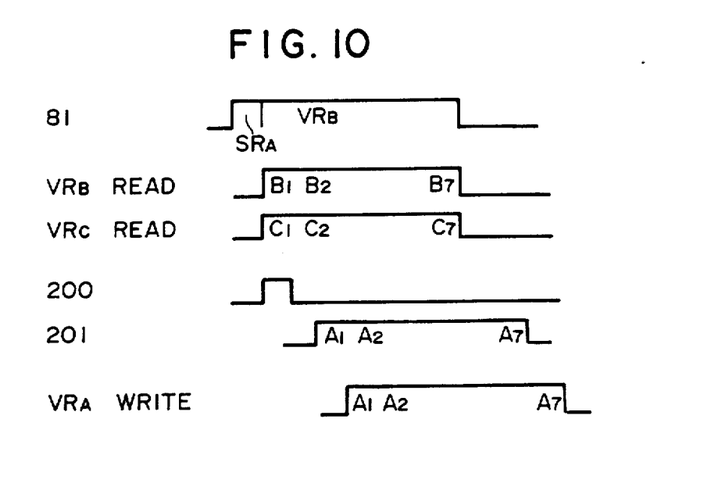
FIG. 10 is a time chart of an output signal from an R/W control of FIG. 8, and FIG. 11 show another embodiment of the logical pperation apparatus of the present invention.
Figure 11:
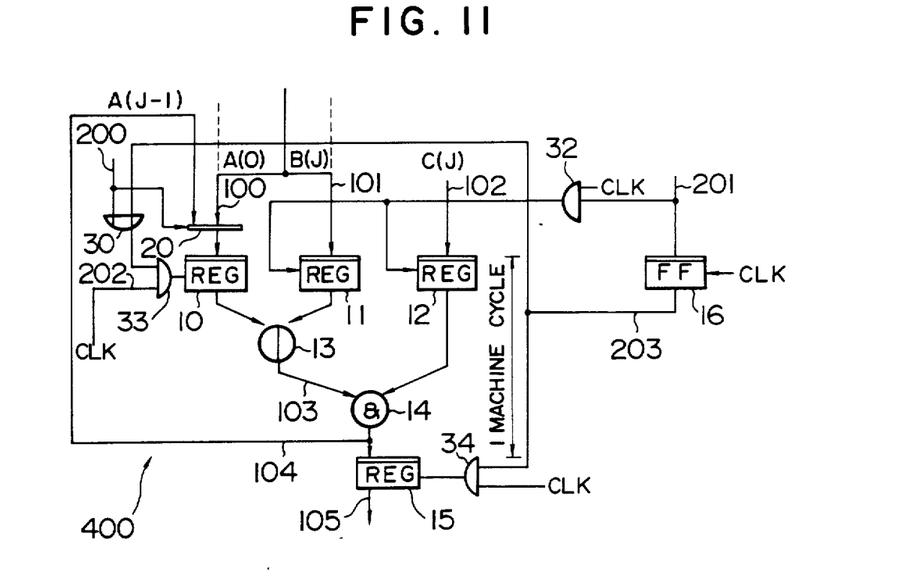

FIG. 10 shows only those of the signals 82 which indicate the registers to be connected to the line 100. In the next cycle, the R/W control 90 outputs the signal 200 to set $A_0$ in the logical operation apparatus 400. In this cycle, the R/W control 90 instructs to the path select 50 by a signal 82 to connect the input 100 of the logical operation apparatus 400 to the vector register 110 having the register number $VR_B$ instead of the scalar register 140. The R/W control 90 also sends the read requests $VR_B$ READ REQ and $VR_C$ READ REQ of the vectors B and C to the vector registers 110 and 120. It also sends the set signal 201 to the logical operation apparatus 400 in synchronism with the readout of the elements of the vectors B and C. It further sends the write request $VR_A$ WRITE REQ to the vector register 130 in synchronism iith the output of the elements of the vector A from the logical operation apparatus 400.

In the present embodiment, the function of the selector 40 of FIG. 4 is performed by the path select 50.

An operation $A(J)=(A(J-1)|B(J))\ \&\ C(J)$ in which the AND operand and the OR operand are exchanged compared to FIG. 1 can be carried out by exchanging the AND gates 13 and the OR gates 14 in FIG. 2.

In accordance with the present invention, the processing which heretofore has been attained only by the scalar processing can be attained by the vector processing at a pitch of one element per machine cycle. Thus, the operation speed is increased by a factor of two in terms of machine cycle, a factor of approximately three in terms of pipeline operation effect and a factor of two in terms of the fact that two-instruction jobs are executed by one instruction. Accordingly, the operation speed is improved by a factor of twelve.

We claim:

1. A vector logical operation apparatus, comprising:
   first and second register means for sequentially receiving first and second sets of vector elements, respectively, which first and second sets of vector elements are supplied in pairs on the same sequential clock periods;
   third register means for holding bit signals;

a plurality of first gate means connected to said first and third register means in a bitwise manner each for performing a first bitwise logical operation on bit signals provided from said first register means and said third register means;
a plurality of second gate means connected to said second register means and said plurality of first gate means in a bitwise manner each for performing a second bitwise logical operation on bit signals provided from said second register means and said plurality of first gate means;
feed back means connected to said plurality of second gate means for supplying the outputs of said plurality of second gate means to said third register means in a bitwise manner; and
control means connected to said third register means for ordering said third register means to receive an applied initial data signal on or before supply of a pair of the first vector element of the first set and the first vector element of the second set and to repeatedly receive the outputs of said plurality of second gate means provided by said feed back means on sequential clock periods each clock period being one clock period later after receipt of a pair of vector elements by said first and second register means;
wherein said plurality of first and second gate means are fast enough so that the outputs of said plurality of second gate means at the end of each clock period fully responds to vector elements held by said first to third register means at the beginning of each clock period.

2. An apparatus according to claim 1, wherein:
said plurality of first gate means includes a plurality of AND gate means each connected to said first register means and said third register means in a bitwise manner, and
said plurality of second gate means includes a plurality of OR gate means each connected to said second register means and said plurality of AND gate means in a bitwise manner.

3. An apparatus according to claim 1, wherein:
said plurality of first gate means includes a plurality of OR gate means each connected to said first register means and said third register means in a bitwise manner, and
said plurality of second gate means includes a plurality of AND gate means each connected to said second register means and one of said plurality of OR gate means in a bitwise manner.

4. An apparatus according to claim 1,
wherein a common input line is connected to one of said first and second register means and said third register means, and
wherein said control means includes means for ordering said third register means to receive the first vector element of the third set provided on the common input line before the first vector element of the first set is provided on the common input line.

5. An apparatus according to claim 1, wherein said control means includes select means for selectively connecting one of said common input line and said feed back means to said third register means.

6. A vector processor, comprising:
data storage means for holding vector elements;
first and second access means connected to said data storage means each for sequentially generating addresses for a different one of first and second sets of vector elements to be fetched from said data storage means, based upon an address of a starting vector element of the one set and an address increment between two neighboring vector elements of the one set;
third access means connected to said data storage means for sequentially generating addresses for a third set of vector elements, based upon an address of a starting vector element of the third set and an address increment between two neighboring vector elements of the third set, said first vector element of the set being to be fetched from said data storage means and remaining vector elements of the third set being to be stored in said data storage means;
operation means connected to said data storage means for receiving the first vector element of the third set and sequentially receiving the first and second sets of vector elements in pairs and for performing two bitwise logical operations repeatedly in a pipelined manner, logical operation being each related to the received vector elements of the third set, the results of the operation on the received pairs being dependent on said received first vector element of the third set;
control means connected to control said data storage means and said first to third access means so that said pairs of vector elements of the first and second sets of vector elements are sequentially read out based upon the addresses generated by said first and second access means, so that sequential outputs of said operation means corresponding to the results of the operation are stored in stored in storage locations within said data storage means for vector elements starting from the second vector element of the third set, based upon the address generated by said third address means, and so that the first vector element of the third set is read out of said data storage means, based upon the address generated first by said third access means and on or before reading of a pair of the first vector elements of the first and second sets.

7. A vector processor according to claim 6, wherein said operation means includes:
first and second register means respectively for sequentially receiving first and second sets of vector elements which first and second sets of vector elements are supplied in pairs on the same sequential clock periods;
third register means;
a plurality of first gate means connected to said first and third register means in a bitwise manner each for performing a first bitwise logical operation on bit signals provided from said first register means and said third register means;
a plurality of second gate means connected to said second register means and said plurality of first gate means in a bitwise manner each for performing a second bitwise logical operation on bit signals provided from said second register means and said plurality of first gate means; and
feed back means connected to said plurality of second gate means for supplying the outputs of said plurality of second gate means to said third register means;
wherein said plurality of first and second gate means are fast enough so that the outputs of said plurality of second gate means at the end of each clock period fully responds to vector elements held by said first to third register means at the beginning of each clock period wherein control means is connected to said thid register means for ordering said third register means to receive the first vector element of the third set on or before supply of a pair of the first vector element of the first set and the first vector element of the second set and to repeatedly receive the outputs of said plurality of second gate means provided by said feed back means on sequential clock periods each clock period being one clock period later after receipt of a pair of vector elements by said first and second register means.

8. A vector processor according to claim 6, further comprising select means for fist transferring onto a common input line the first vector element of the third set readout of said data storage means and for then transferring onto the common input line, one of the first and second set of vector elements read out of said data storage means after readout of the first vector element of the third set;

wherein the common input line is connected to one of said first and second register means and said third register means, and wherein said control means includes means for ordering said third register means to receive the first vector element of the third set provided on the common input line before the first vector element of the first set is provided on the common input line.

* * * * *